Patented Jan. 20, 1953

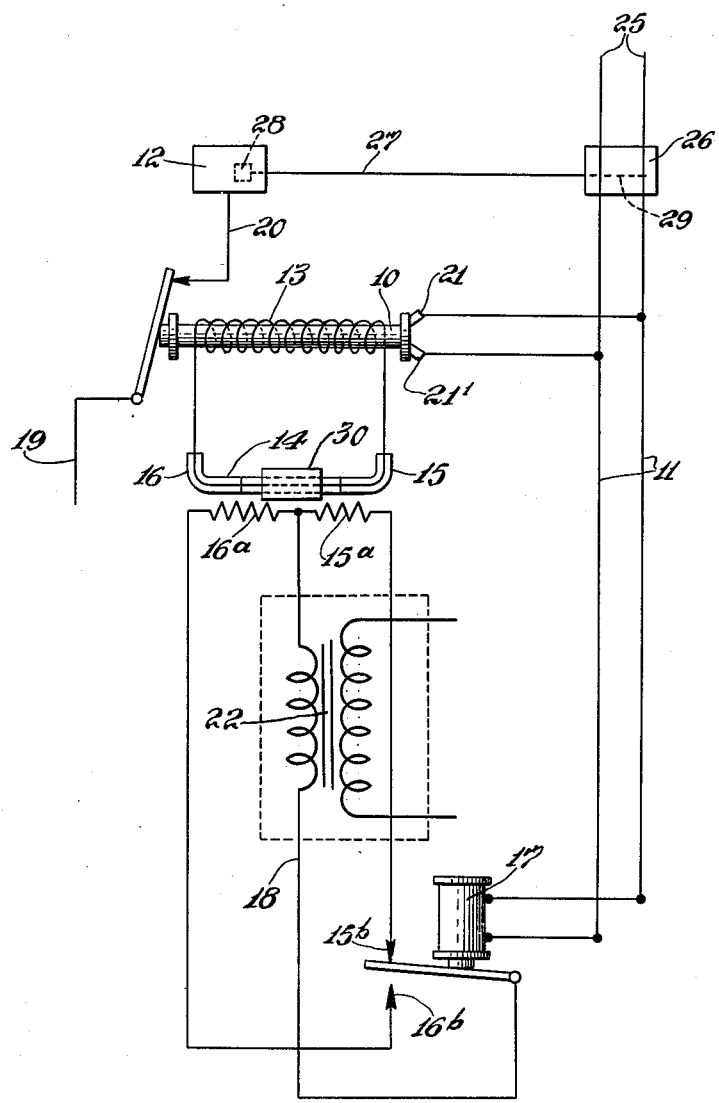

2,626,311

UNITED STATES PATENT OFFICE 2,626,311

ELECTRIC SWITCH

William E. Engelhard, North Arlington, N. J.

Application January 17, 1951, Serial No. 206,367

3 Claims. (Cl. 175—375)

This invention relates to electric switches such as are used for the control of circuits or power sources for electrically actuated apparatus, such as, for example, electric furnaces and the like. The current through such switches in some cases is passed through a valve, such as a vacuum tube, photo-electric cell, or the like, the output of which in turn is affected by changes in temperature or other variable condition. For example, it is old in the art to provide a mechanism for the control of an electric furnace wherein, when the temperature in the furnace builds up to a predetermined value, an apparatus will be actuated responsive to said temperature rise to open the furnace circuit.

An apparatus of the type above referred to is exemplified in my application for "Switch Control Device" executed simultaneously herewith and filed January 17, 1951, Serial No. 206,366; and wherein the reference characters 31, 32 indicate the mechanism affected by change in temperature or other condition and the reference character 40 designates a valve through which the current flows to the switch 42 in the circuit of the furnace or other mechanism to be controlled. In said application, I have disclosed a form of switch control device which is designed to modify the conventional mechanism above referred to, as will become apparent from a consideration of the drawings and description of said application.

The present application is broadly designed to provide a means for accelerating the moment of opening of the control switch which, in the drawings of this application, is designated by the reference character 10, responsive to a rise in temperature or other condition toward the predetermined value, and to automatically accelerate the moment of closing said control switch responsive to the fall of the temperature or other condition below the predetermined value. For example, the invention is adapted to control the object 12 which may be the heating unit of a furnace so as to actuate the same only when the temperature thereof falls below a certain point. It is desirable, in many cases, to adhere quite closely to a predetermined temperature for best operation. The present invention provides an automatic control which will cut off the heating unit, for example, just as the temperature is about to reach the predetermined point, at the same time guarding against too great a drop by turning the same on again as soon as the temperature drops only sufficient to be just past the desired point—in other words, to turn it on again as the temperature returns to the desired point.

The invention obviously also embraces the reverse arrangement—closing the control switch responsive to an approach to the desired or predetermined condition and opening it on departure therefrom. The specific application of the invention to meet the requirements of the job at hand will be obvious from a consideration of the description below and the accompanying drawing which illustrate one of several possible practical embodiments of the invention which will become apparent to those skilled in this art from the present disclosure.

In the drawings:

The figure represents a schematic wiring diagram of a mechanism embodying the invention.

As shown in the drawings, the switch mechanism of the present invention comprises an electro-magnetic control switch 10, actuated by an electro-magnetic coil whose ends are connected to taps 21, 21' wired to the circuit 11. When current from circuit 11 is passed through the control switch 10 of sufficient value to set up an electro-magnetic field to actuate the said switch, the switch will close the circuit 19, 20. But when the current through circuit 11 is of less than said predetermined value, the electro-magnetic field will be inadequate for the purpose mentioned and the switch will open, breaking the circuit 19, 20.

Pursuant to the instant invention, a coil 13 is juxtaposed in the area of the electro-magnetic field which actuates the switch 10, and a thermocouple bar 14 is connected at its ends 15, 16 to said coil 13. Heater elements 15a, 16a, juxtaposed relative to said bar ends for heating said ends, are connected selectively by switch 17 to a heat source indicated generally at 22. Said heat source 22 may be a heat transformer power source of any desired or convenient construction or the like for selective connection through the heater switch 17 to the heater element contacts 15b, 16b. The switch 17 is movable to operative position on one of the contacts 15b, 16b, leading to the heater coils 15a, 16a selectively responsive to maintenance of the value of current in circuit 11 sufficient to actuate the switch 17, and to the other operative position on the other contact when the current falls below that value.

Thus, in one operative position of the heater switch 17, a heater element will be actuated to heat the adjacent end of the thermo-couple bar 14 to pass a current through coil 13 in a direction which will oppose the operative electro-magnetic field of the coil of switch 10 connected to the taps 21, 21'. This will have the effect of accelerating the moment of opening of switch 10 by accelerating the moment when the current flowing therethrough will be inadequate to actuate the same. The drop in current, opening switch 10, will actuate switch 17 to its other operative position, sending current through coil 13 in a direction to assist the operative electro-magnetic field of the switch 10 so that, when the current from circuit 11 flowing through the coil connected to taps 21, 21' approaches the moment of attaining the predetermined value, the switch 10 will operate in advance of and in anticipation of said moment.

The operation above described is repeated responsive to the current conditions of circuit 11 which, in turn, is controlled by the condition responsive valve 26 between circuit 11 and power source 25, the valve 26 being connected to the object 12 as indicated at 27 and modifying the value of current 11 responsive to the condition of object 12. The apparatus is accordingly effective to anticipate the moments of normal opening and closing action of control switch 10 and to thus open the switch and close the switch sooner than would normally occur.

Control switches such as switch 10 are used, for example, to control temperatures and other conditions which, in accordance with the law of inertia, continue in a given direction for at least a short period of time after starting to move in the direction. The mechanism described anticipates this inertia effect to smooth out or modulate the action so as to make the same less abrupt, by an automatic switch mechanism of maximum practical utility.

The value of the electro-magnetic field set up in coil 13 by the heating of thermo-couple bar 14 is only a fraction of the value of the electro-magnetic field set up in the operative coil connected to taps 21, 21' of switch 10. Thus, the coil 13 adds to or subtracts from the value of the coil of switch 10 connected to taps 21, 21' according to the direction of flow of current through coil 13, which in turn depends on which end of the thermo-couple bar 14 is being heated.

The control switches 10 and 17 shown in the drawings are of the well-known relay type utilizing an electro-magnetic coil to actuate the same. Other electro-magnetic mechanisms, such as solenoids, etc., may be used; in fact, the switch 10 may be any mechanism the operation of which will be affected by the electro-magnetic field set up by coil 13 pursuant to the invention. The illustration in the drawings of control switches 10 and 17 are simply by way of example. It will likewise be understood that the heater coils 15a, 16a and the heater source 22 may be varied, other heating elements being effective to the same end. The design of the thermo-couple bar 14 might be varied to any other form useful for the indicated purpose. If desired, the heater elements, instead of being adjacent the thermo-couple bar 14, might be directly wound thereon or formed unitarily therewith. The recitation of "heater elements" in the claims or other parts of this application shall be deemed to include heater elements juxtaposed adjacent the bar 14, or wound thereon, or formed unitarily therewith, or otherwise disposed for the purpose mentioned.

It will be apparent from the foregoing description that the mechanism is operative for the purpose mentioned without regard to the specific agent or means causing the current in circuit 11 to fluctuate. As above described, by way of illustration only of one of many possible practical forms of the invention, a valve 26 connected to the object to be controlled 12 may be responsible for the fluctuations of current in circuit 11. The valve 26 may, for example, be a vacuum tube having a grid or other current modifying part 29 affecting the value of current output from valve 26, the grid 29 in turn responding to the condition of object 12 as by connecting the grid 29 with a thermo-couple 28 or the like at object 12.

The thermo-couple bar 14 may be made in any suitable, desired or convenient proportions and outline. It may be positioned in a relatively heavy metallic block 30 which is slotted to receive the same medially intermediate the ends 15, 16 thereof and which will serve as a heat reservoir or storage element, absorbing heat from either heater coils 15a or 16a. The block 30 serves to direct the thermo-electric currents either to the right or to the left, in dependence upon the energization of heater coils 15a or 16a, respectively, the direction of which currents controls the aiding or bucking electro-magnetic effects produced by the coil 13. The device is not affected by room temperature changes, containing as it does the opposed units 15a, 16a, which will neutralize the effect of such changes.

Having thus described my invention, what I claim as new and desire to secure by Letters Patent is:

1. A control system for making and breaking the electrical circuit to a device experiencing fluctuations in energy level, which comprises a main switch, an electromagnet for controlling said switch, a current supply connected to said electromagnet for operating said electromagnet in response to a predetermined intensity of current, an auxiliary magnetic coil disposed in the induction field of said electromagnet in bucking or aiding relation thereto in dependence upon the direction of current flow through said coil, a thermocouple having the opposite ends thereof connected to the opposite ends of said magnetic coil, alternately operated heating device in proximity to the opposite ends of said thermocouple to alternately control the direction of current flow through said thermocouple and magnetic coil and thereby to selectively buck or aid the induction effect of said electromagnet, and a relay switch connected to the current supply for said electromagnet adapted to energize the one of said heating devices which gives rise to said bucking induction effect when the electromagnet is supplied by the more intense current and the other of said heating devices which gives rise to said aiding induction effect when the electromagnet is supplied by the less intense current, whereby said auxiliary magnetic coil accelerates the action of said electromagnet in its alternate control of said main switch.

2. An apparatus as set forth in claim 1 wherein said thermocouple is in the form of a bar with a heavy metallic block at the mid-portion thereof.

3. An apparatus as set forth in claim 1 wherein said heating devices having a common junction point, and said relay switch comprises an electromagnetic coil and a movable armature controlled thereby, an electrical connection from said armature to the common junction point of the heating devices in proximity to said thermocouple including an energy translating device, and a fixed contact on each side of said armature connected to the opposite free ends of said heating devices and adapted to selectively complete an electrical circuit through said armature, one heating device and energy translating device to selectively heat one side of said thermocouple and thereby to energize the auxiliary magnetic coil in the desired sense.

WILLIAM E. ENGELHARD.

REFERENCES CITED

The following references are of record in the file of this patent:

UNITED STATES PATENTS

| Number | Name | Date |
|---|---|---|
| 1,685,995 | Gano | Oct. 2, 1928 |
| 2,139,504 | King | Dec. 6, 1938 |
| 2,215,067 | Denison | Sept. 17, 1940 |
| 2,265,294 | Lange | Dec. 9, 1941 |
| 2,351,277 | Mantz | June 13, 1944 |
| 2,409,492 | Jones | Oct. 15, 1946 |
| 2,446,216 | Dodd | Aug. 3, 1948 |